(12) United States Patent
Kulkarni

(10) Patent No.: US 8,966,495 B2
(45) Date of Patent: Feb. 24, 2015

(54) DYNAMIC VIRTUAL MACHINE CONSOLIDATION

(75) Inventor: Ajay Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 13/604,134

(22) Filed: Sep. 5, 2012

(65) Prior Publication Data
US 2014/0068608 A1 Mar. 6, 2014

(51) Int. Cl.
*G06F 9/50* (2006.01)
*G06F 9/455* (2006.01)
*G06F 15/173* (2006.01)

(52) U.S. Cl.
USPC ............... 718/105; 718/1; 718/104; 709/223; 709/226; 713/300

(58) Field of Classification Search
None
See application file for complete search history.

(56) References Cited

U.S. PATENT DOCUMENTS

| | | | |
|---|---|---|---|
| 8,027,354 B1 | 9/2011 | Portolani et al. | |
| 8,145,929 B2* | 3/2012 | Wong et al. | 713/320 |
| 8,296,591 B1* | 10/2012 | Wong et al. | 713/320 |
| 2011/0264939 A1* | 10/2011 | Wong et al. | 713/323 |

OTHER PUBLICATIONS

Wang, et al., "Consolidating Virtual Machines with Dynamic Bandwidth Demand in Data Centers," IEEE, INFOCOM 2011 Proceedings, Apr. 2011, pp. 1-10.
Mehta, et al., "ReCon: A Tool to Recommend Dynamic Server Consolidation in Multi-Cluster Data Centers," IEEE Network Operations and Management Symposium (NOMS 2008), Apr. 2008, pp. 363-370.
Meng, et al., "Improving the Scalability of Data Center Networks with Traffic-aware Virtual Machine Placement," IEEE, INFOCOM, 2010 Proceedings, Mar. 2010, pp. 1-9.

* cited by examiner

*Primary Examiner* — Qing Wu
(74) *Attorney, Agent, or Firm* — Edell, Shapiro & Finnan, LLC

(57) ABSTRACT

At a first physical computing machine executing a plurality of virtual machines and connected to a network, one or more virtual machine metrics for each virtual machine are calculated. Each virtual machine metric represents a workload of a resource of the first physical computing machine due to the execution of a corresponding virtual machine. Additionally, one or more corresponding physical machine metrics that represent a total workload of the corresponding resource of the first physical computing machine due to the execution of the plurality of virtual machines are also calculated. Based on the one or more physical machine metrics, a determination is made that at least one of the plurality of virtual machines should be migrated to one of a plurality of other physical computing machines connected to the network. A first virtual machine is selected for migration to a selected second physical computing machine.

20 Claims, 8 Drawing Sheets

DYNAMIC VIRTUAL MACHINE CONSOLIDATION

TECHNICAL FIELD

The present disclosure relates to consolidation of virtual machines in a data center.

BACKGROUND

Server virtualization technology allows multiple virtual machines to run concurrently on a single physical computing machine, such as a server computer. Currently, server virtualization is widely used in data center environments to create large clusters of machines that supply massive amounts of computing power.

Data centers are becoming increasingly more densely packed with electronic components to accommodate ever-increasing computing demands. The increased scale and power densities associated with these densely packed data centers typically have a significant impact on the thermal properties of the data centers. As such, data centers can be expensive to power and cool.

DESCRIPTION OF EXAMPLE EMBODIMENTS

Overview

Figure 1:
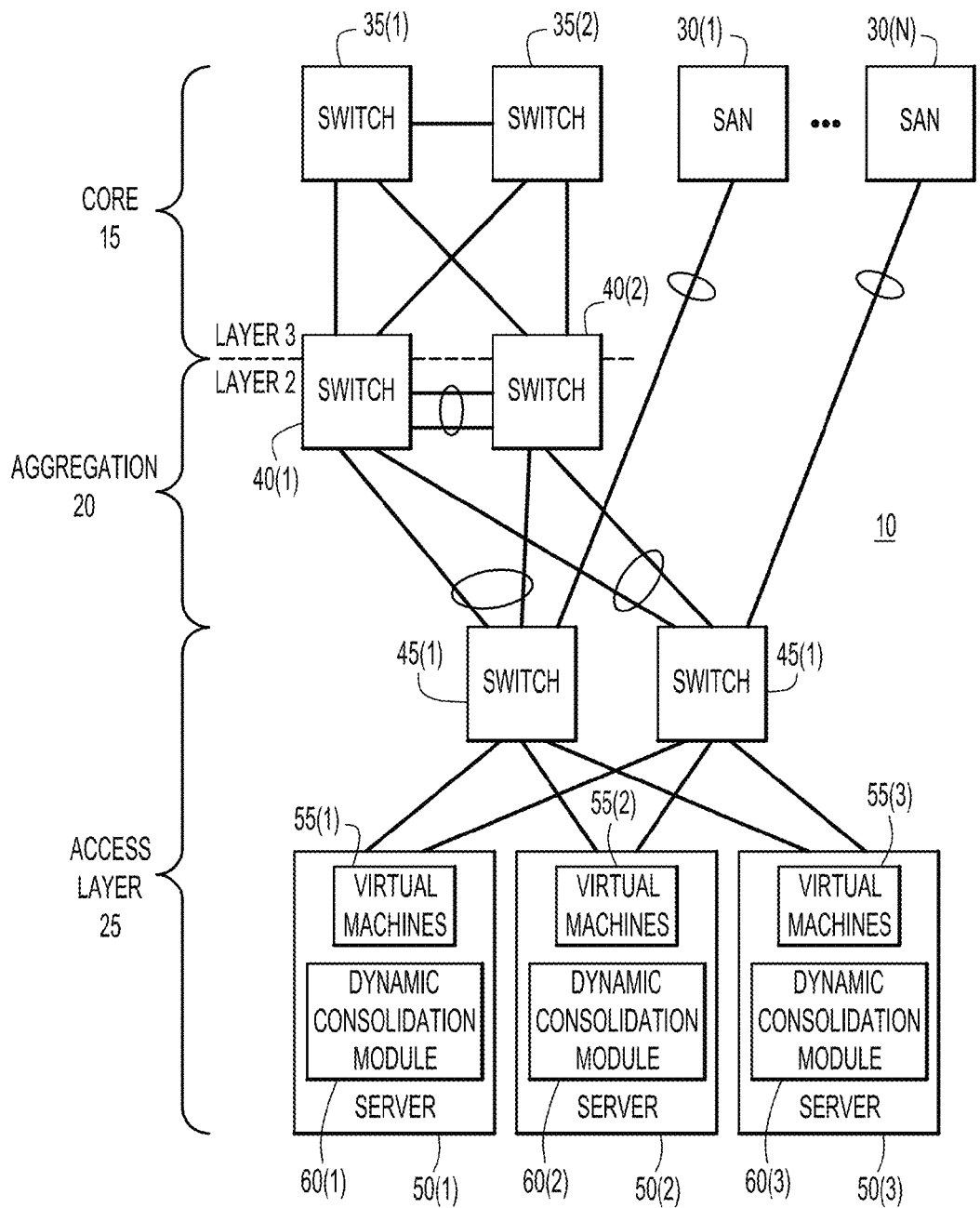
FIG. 1 is a block diagram illustrating an example embodiment of a data center configured in which dynamic virtual machine consolidation techniques may be executed.

Techniques are provided herein for consolidation of virtual machines in a networking arrangement. In one example, at a first physical computing machine executing a plurality of virtual machines and connected to a network, one or more virtual machine metrics for each virtual machine are calculated. Each virtual machine metric represents a workload of a resource of the first physical computing machine due to the execution of a corresponding virtual machine. Additionally, one or more corresponding physical machine metrics that represent a total workload of the corresponding resource of the first physical computing machine due to the execution of the plurality of virtual machines are also calculated. Based on the one or more physical machine metrics, a determination is made that at least one of the plurality of virtual machines should be migrated to one of a plurality of other physical computing machines connected to the network. A first virtual machine is selected for migration to a selected second physical computing machine.

Example Embodiments

"Green computing" refers to an environmentally responsible use of computing resources, including use of energy-efficient central processing units (CPUs), physical machines, and related peripherals (e.g., networking devices), in a manner that reduces resource/power consumption. Green computing can be a particular concern in certain networking arrangements where large numbers of physical computing machines (e.g., server computers) are supported by large numbers of networking devices (e.g., switches, routers, load balancers, firewalls, etc.).

Provided herein are techniques to dynamically consolidate virtual machines in a networking arrangement such as a data center to a minimal or selected number of physical (computing) machines, thereby reducing the number of active (running) physical machines and enabling the deactivation of unused physical machines and supporting networking devices. As used herein, a "deactivated" physical machine or networking device is in a low power-consuming state (e.g., a hibernation state or shutdown). By reducing the number of physical machines and supporting networking devices, power consumption within the data center may be reduced.

Additionally, the virtual machine consolidation techniques presented herein have the added benefit of consolidating the virtual machines to physical machines disposed at selected (e.g., concentrated) locations within the data center. Consolidating the locations of the active physical machines within the data center reduce operational costs and ease maintenance. For example, by reducing the area of a data center that includes active machines, the area in which cooling is needed will be correspondingly reduced (i.e., cooling is only used on the areas with active machines). Reducing the area of a data center that needs to be cooled can have significant impact on costs and power consumption.

Several vendors currently address virtual machine consolidation through planning tools that allow a data center designer to "virtually" select the locations of physical machines using computer software and to pre-allocate expected virtual machines to these physical machines prior to deployment. However, these tools generally consider the virtual machines in isolation and do not consider the dynamic nature of the computing resource requirements. Furthermore, the centralized nature of these planning tools limits the scalability of the deployed data center and may result in under-subscription or over-subscription of different resources. Over-subscription of different resources such as network interface bandwidth, CPU availability, memory, etc. may lead to performance issues. Under-subscription of resources results in unnecessary waste of power. The virtual consolidation techniques described herein provide a distributed and dynamic mechanism that allows for real-time consolidation of virtual machines in a data center or other networking arrangement.

FIG. 1 is a block diagram of an example data center 10 in which the dynamic virtual machine consolidation techniques may be executed. Data center 10 includes a core layer 15, an aggregation layer 20, an access layer 25, and a set of storage area networks (SANs) 30(1)-30(n). Core layer 15 generally represents the backbone of the data center 10 and may include high-end switches, such as switches 35(1) and 35(2), and high-speed cables (e.g., fiber optic cables). Each switch may also include an application control engine (not shown in FIG. 1) that may provide flow monitoring and control, load balancing, and other services.

Aggregation layer 20 typically includes routers and/or layer 3 switches, such as switches 40(1) and 40(2), to ensure that packets are properly forwarded within the network. Access layer 25 may include hubs and switches, such as switches 45(1) and 45(2), to connect client devices (not shown in FIG. 1), physical machines (e.g., servers) 50(1)-50(3), and SANs 30(1)-30($n$) to the network. As described further below, servers 50(1), 50(1), and 50(3) are configured to execute virtual machines 55(1), 55(2), and 55(3), respectively.

Each of the elements shown in FIG. 1 may couple to one another through simple interfaces or through any other suitable connection, which provides a viable pathway for network communications. Data center 10 may include a configuration capable of Ethernet communications, and may also operate in conjunction with the Transmission Control Protocol/Internet Protocol (TCP/IP) communications for the transmission or reception of packets. Data center 10 may also operate in conjunction with the User Datagram Protocol/IP (UDP/IP), Fiber Channel over Ethernet (FCoE) or any other suitable protocol, where appropriate. Input/output (I/O) may be consolidated in data center 10 so that the same physical infrastructure can carry different types of traffic, which typically have different traffic characteristics and transmission requirements.

Data center 10 can, in certain examples, accept and transmit network traffic and perform off-site processing for Internet operations. The front-end of data center 10 can connect to the Internet core, for example, where Internet traffic travels to assigned locations using IP addresses. Traffic can be routed through several layers of switches (e.g., switches 35(1) and 35(2), switches 40(1) and 40(2), and switches 45(1) and 45(2)) to the virtual machines 55(1), 55(2), and 55(3) executed by servers 50(1), 50(2), and 50(3), respectively, for processing, storage, etc. In general, the virtual machines 55(1)-55(3) are configured to fulfill requests from a wide range of network users (individuals, businesses, enterprises, other data centers, etc.). These requests can include, for example, everyday common user tasks, such as loading a web page, streaming audio or video, sending an email, running an application, saving data, or conducting searches or queries, etc.

In certain circumstances, the virtual machines 55(1)-55(3) may be consolidated to a minimal or selected number of physical servers 50(1)-50(3) in order to, for example, reduce power consumption, target cooling efforts within the data center 10, etc. As such, servers 50(1), 50(2), and 50(3) include a dynamic consolidation module 60(1), 60(2), and 60(3), respectively, that enable the servers to perform the virtual machine consolidation techniques.

In the example of FIG. 1, data center 10 has a hierarchical or layered structure of various types of programmable switches that route the traffic to virtual machines 55(1)-55(3) for processing received requests and responding with outgoing traffic. It is to be appreciated that the networking arrangement of FIG. 1 is merely an example and that the dynamic server consolidation techniques may be executed in other networking arrangements.

Figure 2:
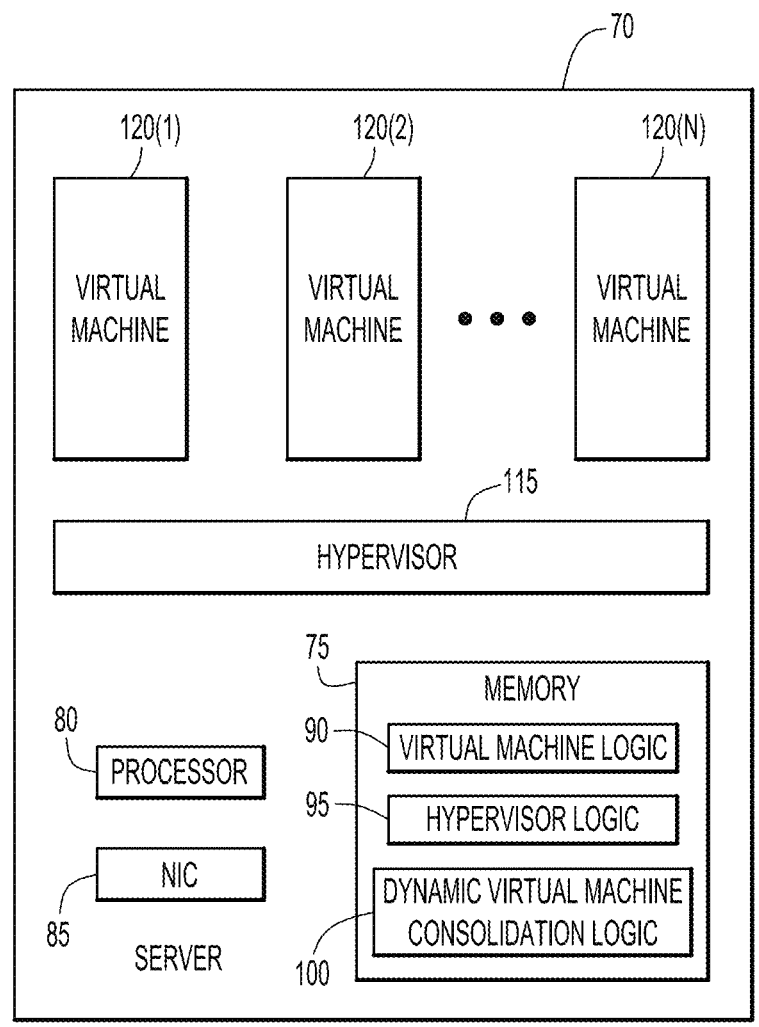
FIG. 2 is a functional block diagram of a physical computing machine configured to execute the dynamic virtual machine consolidation techniques.

FIG. 2 is a functional block diagram of a physical computing machine (server computer) 70 configured to execute the dynamic virtual machine consolidation techniques provided herein. Any of the physical servers 50(1)-50(3) shown in FIG. 1 may have the configuration for a physical machine shown in FIG. 2. Server 70 comprises a memory 75, a processor 80, and a network interface card (NIC) 85 (i.e., network interface hardware). Memory 75 includes virtual machine logic 90, hypervisor logic 95, and dynamic virtual machine consolidation logic 100.

Running on top of the server hardware (through execution of hypervisor logic 105 and virtual machine logic 90, respectively) is a hypervisor 115 and virtual machines 120(1)-120($n$). In one example, the hypervisor 115 and virtual machines 120(1)-120($n$) may be executed as software layers that run directly on the hardware of server 70. The hypervisor 115 may intercept some, or all, operating system calls to the hardware from virtual machines 120(1)-120($n$). The hypervisor 115 is executed using a specially privileged kernel that can access hardware devices and that can create/destroy virtual machines on the server 70. As such, virtual machines 120(1)-120($n$) running on the server 70 share the system hardware (e.g., processor 80, memory 75, etc.), but are generally not directly aware of the system hardware. Instead, the hypervisor 115 provides virtual hardware for use by virtual machines 120(1)-120($n$) (e.g., a virtual switch, processor, memory, etc.). Each virtual machine 120(1)-120($n$) may load and run an operating system on the virtual hardware exposed by the hypervisor 115. Together, the virtual hardware and operating system provide a virtualized computing platform for applications to run in an application layer of a given virtual machine 120(1)-120($n$).

In many conventional data centers, virtual machines may be created independently on servers by, for example, a local process. As such, there is little or no control as to where a particular virtual machine is created or what type of service the virtual machine will provide. For example, a virtual machine can be used to perform computationally intensive tasks (i.e., consume significant computing/CPU resources and/or memory resources), network intensive tasks (i.e., consume significant bandwidth), storage intensive tasks (i.e., perform signification read/write operations such as database management), etc. Due to the disparate tasks of virtual machines and the lack of control of where a virtual machine is created, it is possible that the resources of a physical server executing a plurality of virtual machines (i.e., the server's CPU, memory, and/or supporting network elements) may be over-subscribed/over-utilized. In other words, the server resources (including any supporting network elements) may have insufficient capacity to support the demands of all of the virtual machines. Alternatively, these same factors may lead to physical servers in which the server resources are under-subscribed/under-utilized (i.e., the server resources that a capacity that exceeds the resources needed by the virtual machines).

Memory 75 includes dynamic virtual machine consolidation logic 100 that, when executed, is operable to perform real-time consolidation of virtual machines within a computing environment so as reduce and/or substantially eliminate over-utilization/underutilization of servers, network elements, etc. In other words, the dynamic virtual machine consolidation logic 100 performs the operations of one of the dynamic consolidation modules 60(1)-60(3) referred to in connection with FIG. 1. Memory 75 may comprise read only memory (ROM), random access memory (RAM), magnetic disk storage media devices, optical storage media devices, flash memory devices, electrical, optical, or other physical/tangible memory storage devices. The processor 80 is, for example, a microprocessor or microcontroller that executes instructions for the virtual machine logic 90, hypervisor logic 95, and dynamic virtual machine consolidation logic 100. Thus, in general, the memory 75 may comprise one or more tangible (non-transitory) computer readable storage media (e.g., a memory device) encoded with software comprising computer executable instructions and when the software is executed (by the processor 80) it is operable to perform the operations described herein in connection with virtual machine logic 90, hypervisor logic 95, and dynamic virtual machine consolidation logic 100.

Figure 3A:
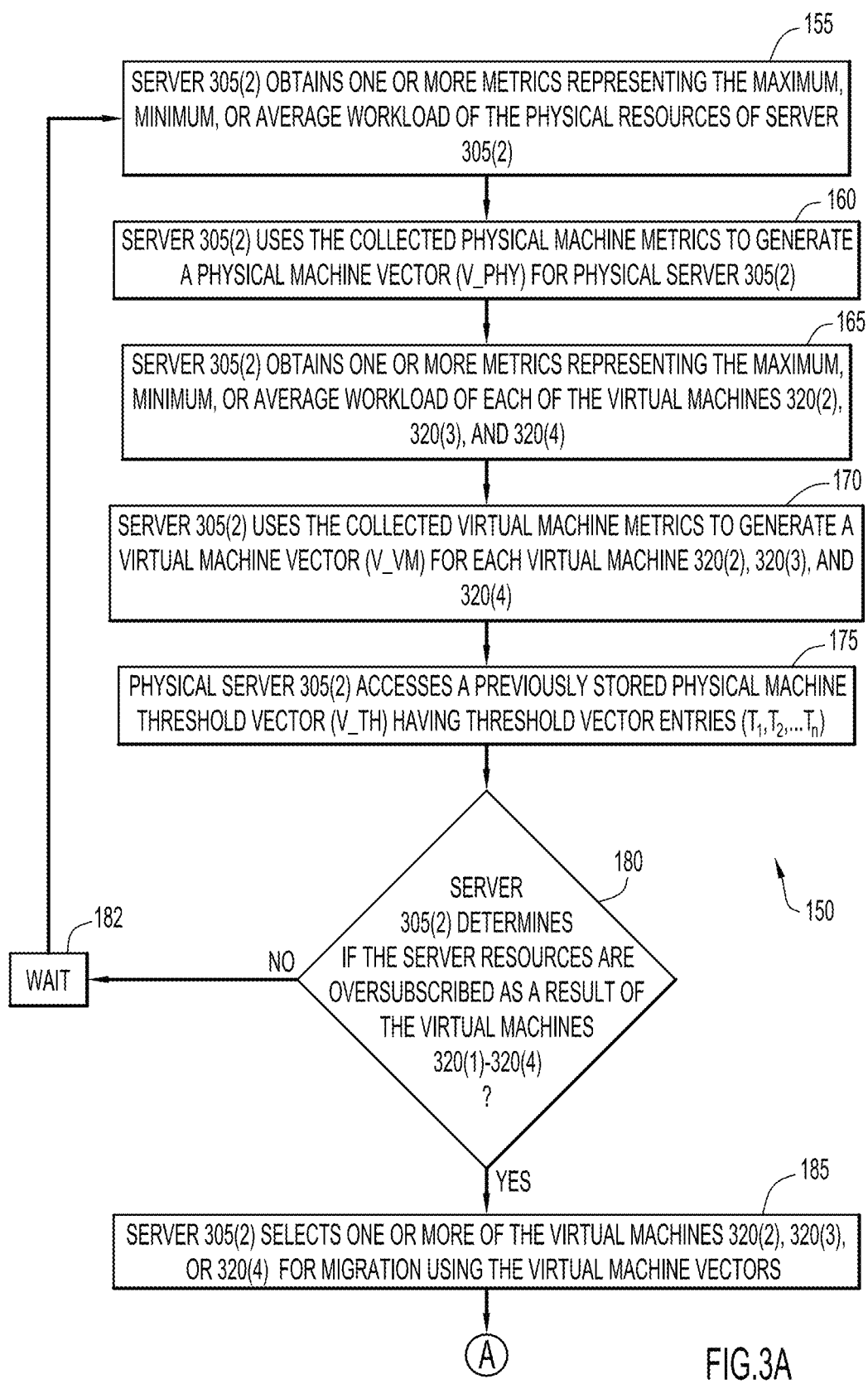
FIGS. 3A and 3B collectively illustrate a flowchart of an example method for dynamic consolidation of virtual machines in a data center.
Figure 3B:
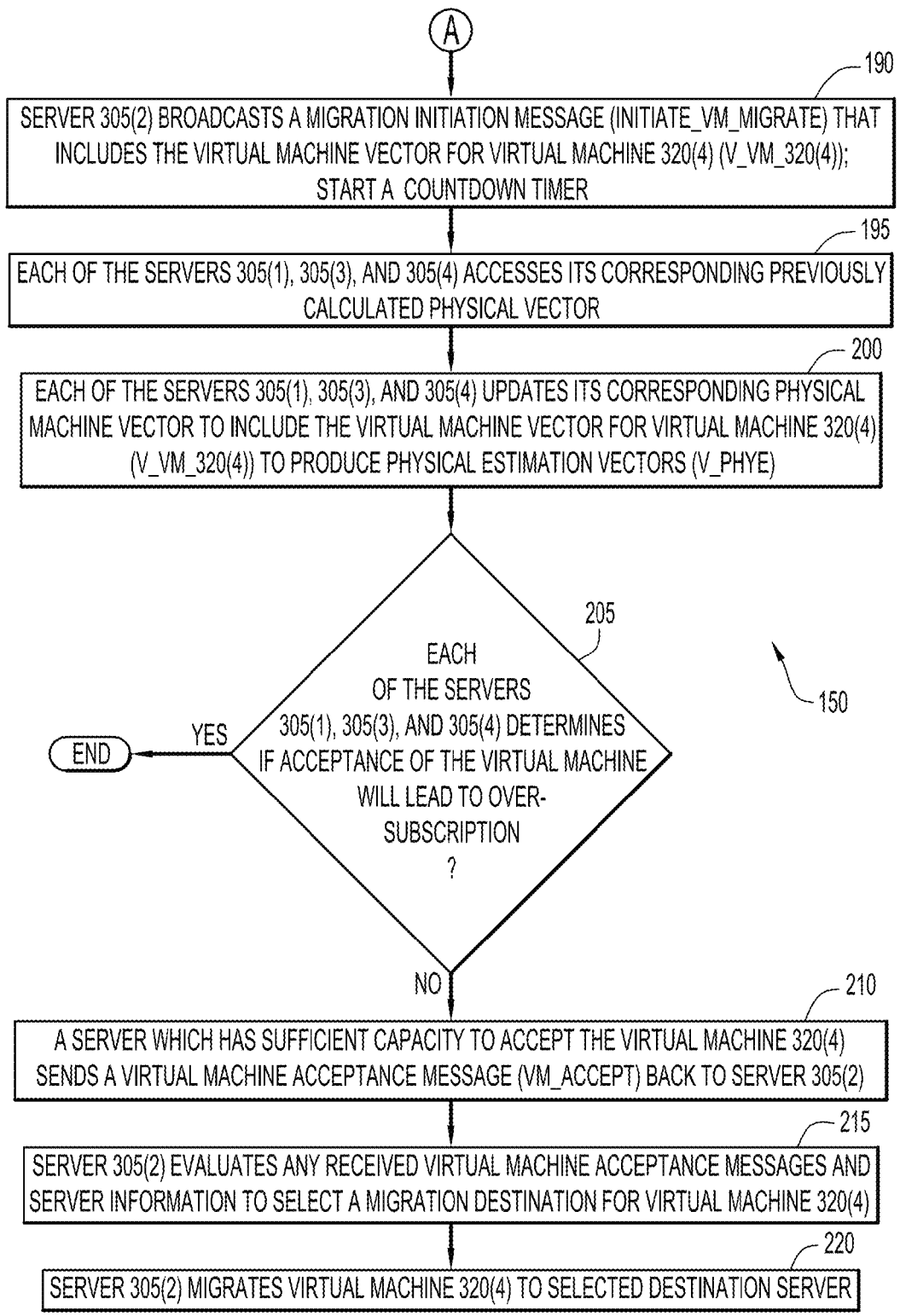
Figure 4:
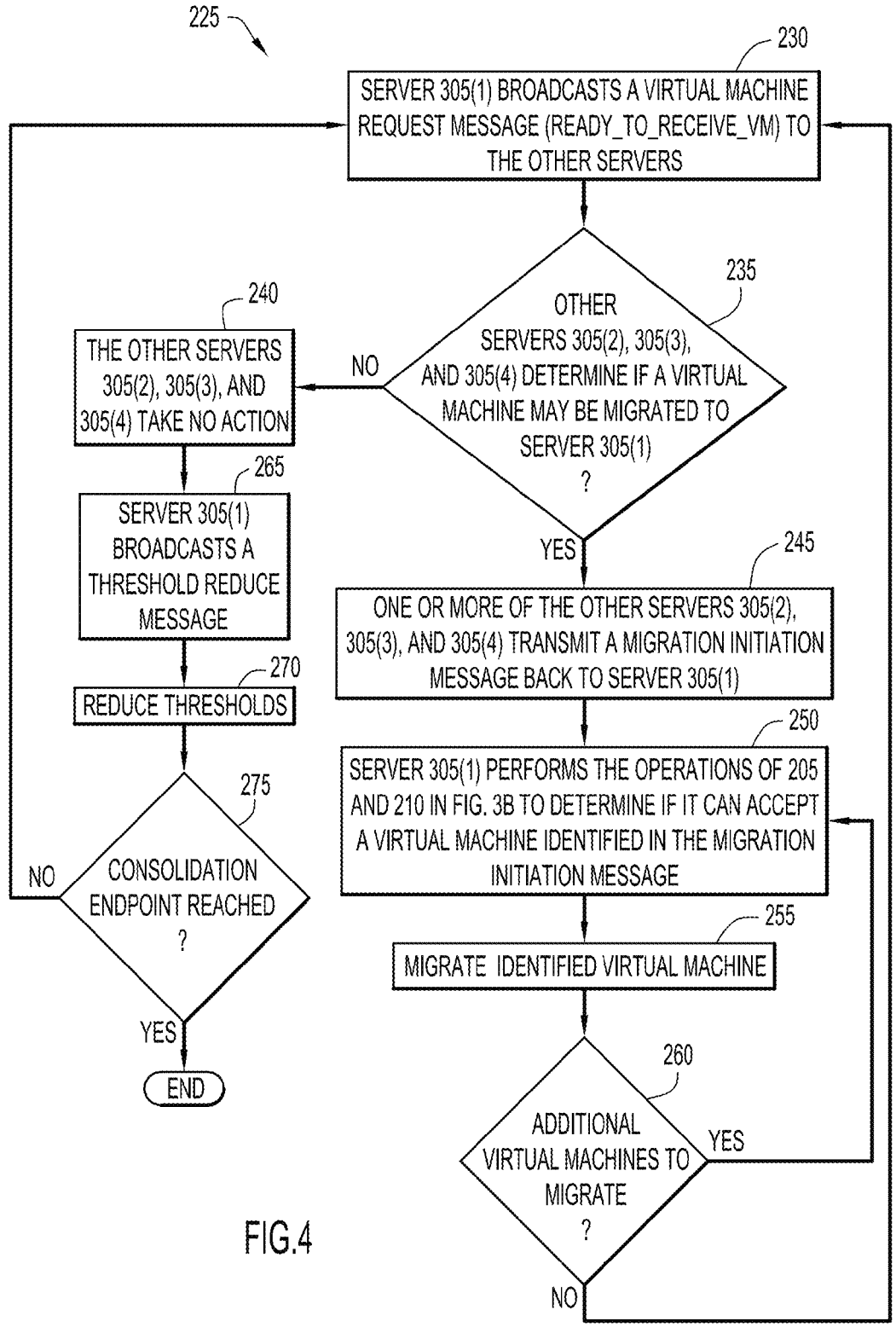
FIG. 4 is a flowchart of another example method for dynamic consolidation of virtual machines in a data center.
Figure 5:
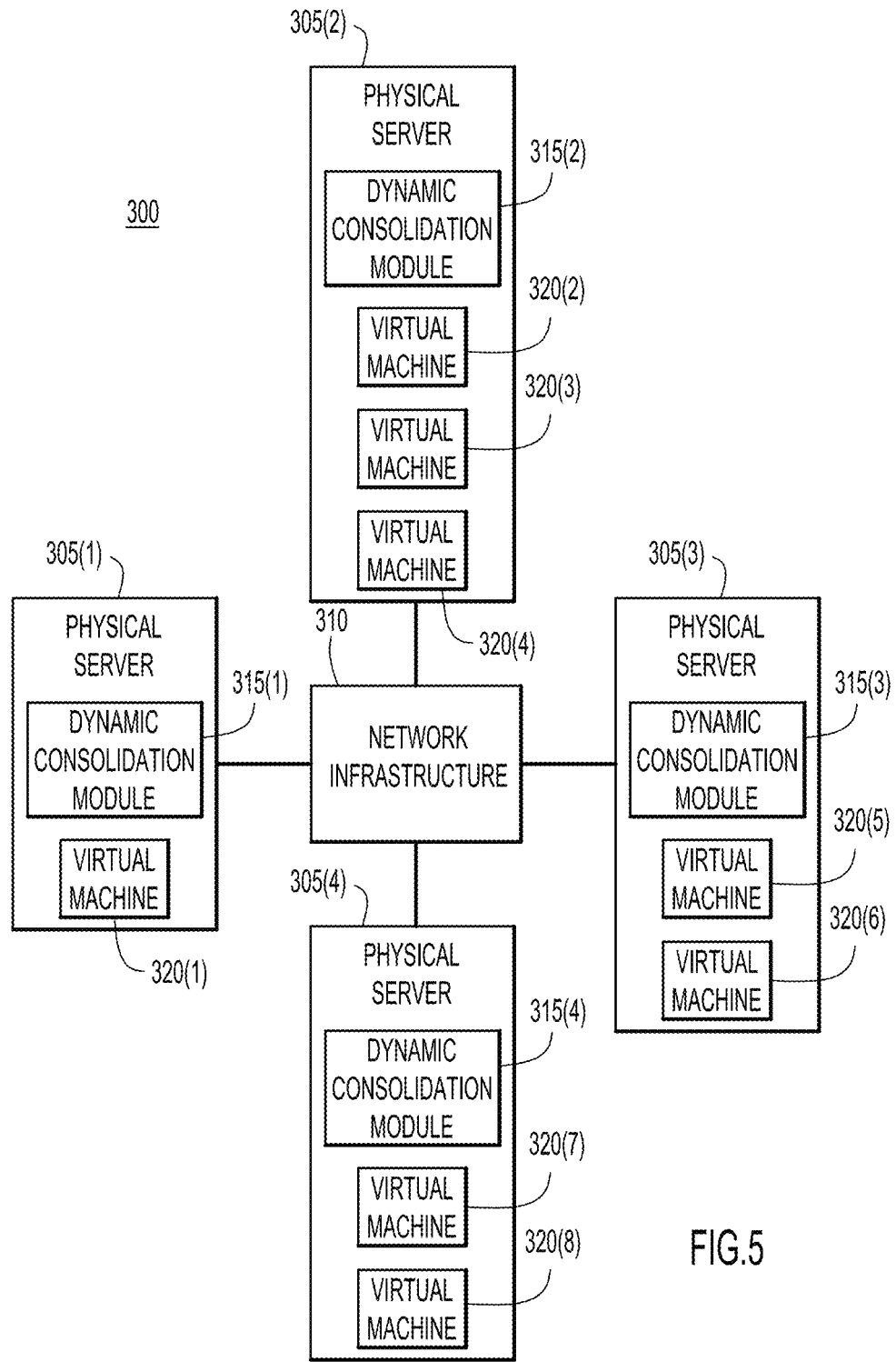
FIG. 5 is a block diagram of another data center in which dynamic virtual machine consolidation techniques may be executed.

FIGS. 3A and 3B illustrate an example method 150 for dynamic consolidation of virtual machines in a data center. Similarly, FIG. 4 is a flowchart of another example method 225 for dynamic consolidation of virtual machines in a data center. FIGS. 3A, 3B, and 4 will be described with reference to an example data center 300 shown in FIG. 5 that comprises a plurality of physical computing machines (servers) 305(1)-305(4) connected to a network infrastructure 310 that may comprise any number of networking elements such as switches, routers, firewalls, load balancers, etc. implemented in hardware and/or software. For ease of illustration, these various networking elements are not shown in FIG. 5.

The servers 305(1)-305(4) may be implemented as described above for server 70 of FIG. 2 and each comprises a processor, a NIC, and a memory that includes virtual machine logic, hypervisor logic, and dynamic virtual machine consolidation logic. For ease of illustration, these elements are not shown in FIG. 5 and the dynamic virtual machine consolidation functionality is represented in servers 305(1), 305(2), 305(3), and 305(4) by dynamic consolidation modules 315(1), 315(2), 315(3), and 315(4), respectively. In this example, server 305(1) executes a single virtual machine 320(1), while server 305(2) executes three virtual machines 320(2), 320(3), and 320(4). Server 305(3) executes two virtual machines 320(5) and 320(6), while server 305(4) executes virtual machines 320(7) and 320(8).

Method 150 begins at 155 where server 305(2) obtains/calculates one or more physical machine metrics representing the maximum, minimum, or average workload (i.e., level of consumption) of the physical resources of server 305(2). As used herein, the physical resources of a server include the resources of any supporting networking elements. For example, server 305(2) may calculate metrics representing the maximum/minimum/average CPU utilization recorded on the server 305(2), the maximum/minimum/average network bandwidth used on the server 305(2), the number of writes and/or reads to a disk or entity during a time period, the bandwidth consumed on a connected switch, etc. The physical machine metrics will inherently encompass any workload that is the result of execution of virtual machines 320(2), 320(3), and 320(4), as well as the workload that is a result of physical machine processes.

At 160, the server 305(2) uses the collected physical machine metrics to generate a physical machine vector (V_PHY) for physical server 305(2) that includes a plurality of physical machine vector entries ($P_1$, $P_2$, . . . $P_n$). The physical machine vector for physical server 305(2) is shown below as:

$$V\_PHY\_305(2) = [P_{1\_305(2)}, P_{2\_305(2)}, \ldots P_{n\_305(2)}]$$

The physical machine vector entries ($P_1$-$P_n$) are each specific to a particular server resource and are, in essence, a summation of a particular physical machine metric collected across the entire physical server. For example, an entry in the physical vector may correspond to the maximum memory workload of server 305(2). This maximum memory workload entry will represent the memory utilized by each of the virtual machines 320(2), 320(3), and 320(4), as well as the memory utilized by the hardware and software elements of server 305(2) outside of the virtual machines.

At 165, the server 305(2) obtains one or more virtual machine metrics representing the maximum, minimum, or average workload (i.e., level of consumption) of each of the virtual machines 320(2), 320(3), and 320(4). For example, server 305(2) may collect virtual machine metrics representing the maximum/minimum/average CPU utilization attributable to a specific virtual machine, the maximum/minimum/average network bandwidth used by a specific virtual machine, the number of writes and/or reads to a disk or entity by a specific virtual machine during a time period, etc.

At 170, the server 305(2) uses the collected virtual machine metrics to generate a virtual machine vector (V_VM) for each virtual machine 320(2), 320(3), and 320(4) that include a plurality of virtual machine vector entries ($S_1$, $S_2$, ... $S_n$). The nomenclature V_VM_i stands for the virtual machine vector of ith virtual machine instance. As such, the virtual machine vectors for virtual machines 320(2), 320(3), and 320(4) are shown below as:

$$V\_VM\_320(2) = [S_{1\_320(2)}, S_{2\_320(2)}, \ldots S_{n\_320(2)}]$$

$$V\_VM\_320(3) = [S_{1\_320(3)}, S_{2\_320(3)}, \ldots S_{n\_320(3)}]$$

$$V\_VM\_320(4) = [S_{1\_320(4)}, S_{2\_320(4)}, \ldots S_{n\_320(4)}]$$

The virtual machine vector entries ($S_1$-$S_n$) are each specific to a particular server resource and reflect the level of consumption of that resource as a result of execution of the corresponding virtual machine. For example, a vector entry (e.g., $S_{1\text{-}320(2)}$) in the virtual machine vector for virtual machine 320(2) (i.e., V_VM_320(2)) may correspond to the maximum memory workload of virtual machine 320(2). This maximum memory workload entry will represent only the memory utilized by virtual machine 320(2).

In the example of FIG. 3, the hypervisor of server 305(2) calculates or otherwise obtains the physical machine and virtual machine metrics. For example, the hypervisor may have information regarding how many packets have been sent from each virtual machine, how many read/write operations or memory accesses have occurred from each virtual machine, etc. In one example, the hypervisor is configured to record these parameters and subsequently use this information to generate the physical machine and virtual machine vectors.

As noted above, a general objective in data centers is to have the physical servers sufficiently loaded with virtual machines, but not loaded to a point where over-subscription degrades the performance. As such, at 175, physical server 305(2) will access threshold values that represent maximum acceptable workloads for each of the server resources. In one example, physical server 305(2) accesses a previously stored physical machine threshold vector (V_TH) having threshold vector entries ($T_1$, $T_2$, . . . $T_n$). The threshold vector for physical server 305(2) is shown below as:

$$V\_TH\_305(2) = [T_{1\_305(2)}, T_{2\_305(2)}, \ldots T_{n\_305(2)}]$$

The threshold vector entries ($T_1$-$T_n$) each correspond to a maximum allowable/acceptable workload for various server resources, such as memory, CPU utilization, bandwidth, etc. These workload thresholds are server limits that, if exceeded, will result in degraded performance of the server and any executed virtual machines. For example, an entry in the threshold vector may correspond to the maximum acceptable memory workload of server 305(2). This maximum acceptable memory workload entry will represent the memory utilization level that should not be exceeded by the total of all virtual machines 320(2), 320(3), and 320(4), and the hardware and software elements of server 305(2) outside of the virtual machines. The workload thresholds may vary and can be determined based on, for example, hardware or software limitations of the server, network resources used by the server, the network topology, etc.

At 180, the server 305(2) compares the physical machine vector (V_PHY_305(2)) to the threshold vector V_TH_305(2) to determine if the server resources are oversubscribed as a result of execution of the virtual machines 320(1)-320(4). More specifically, the server 305(2) performs a sequential comparison of each of the physical machine vector entries to corresponding threshold vector entries. If all of the physical machine vector entries are less than the corresponding threshold vector entries, then the resources of server 305(2) are not oversubscribed. (i.e., if all of $V\_PHY\_P_i < V\_TH\_T_i$, then there is no over-subscription). As such, method 150 may then proceed to 182 where the system waits a period of time before returning to 155 to recalculate/validate the physical machine and virtual machine vectors before re-performing the comparison. The return to 155 will capture changes to the vectors resulting from, for example, the addition or removal of virtual machines.

Returning to 180, if it is determined that any one of the physical machine vector entries is greater than a corresponding threshold vector entry, then the resources of server 305(2) are over-subscribed (i.e., if one of $V\_PHY\_P_i > V\_TH\_T_i$, then there is over-subscription). As such, one or more of virtual machines 320(2), 320(3), or 320(4) should be migrated to another physical server.

Once it is determined that the resources of server 305(2) are over-subscribed, at 185 one or more of the virtual machines 320(2), 320(3), or 320(4) are selected for migration. In one example, the virtual machine vectors are used to select the server to be migrated. More specifically, server 305(2) may be configured to select for migration the specific machine that will place the physical server 305(2) under, but closest to, the exceeded threshold value. For example, it may be determined that the physical server 305(2) has a CPU utilization threshold of 65%, but that the CPU utilization of physical server 305(2) (when executing virtual machines 320(2), 320(3), or 320(4)) is at 70%, thereby exceeding the threshold. The server 305(2) determines that if virtual machine 320(2) is removed the total CPU utilization will fall to 55%. The server 305(2) also determines that if virtual machine 320(3) is removed the total CPU utilization will fall to 50%, and that if virtual machine 320(4) is removed the CPU utilization will fall to 60%. Because the removal of virtual machine 320(4) will place server 305(2) under the threshold, but at a CPU utilization level that is closest to the threshold (in comparison with the other virtual machines 320(2) and 320(3)), virtual machine 320(4) is selected for migration. This process of selecting the select for migration a virtual machine that will place the physical server 305(1) under, but closest to, the exceeded threshold is referred to herein as a threshold-compliance minimization process.

After selection of virtual machine 320(4) for migration, at 190 the server 305(2) is configured to broadcast a migration initiation message (INITIATE_VM_MIGRATE) that includes the virtual machine vector for virtual machine 320 (4) (V_VM_320(4)). At the same time, server 305(2) may also start a countdown counter that is described further below.

The migration initiation message is received by each of the other network connected and active servers 305(1), 305(3), and 305(4) in data center 300. In response, at 195, each of the servers 305(1), 305(3), and 305(4) are configured to access its corresponding previously calculated physical machine vector. In other words, each server 305(1), 305(3), and 305(4) has a corresponding physical machine vector V_PHY_305(1), V_PHY_305(3), and V_PHY_305(4) that represents the total workload of various server resources of the respective server. Alternatively, the servers 305(1), 305(3), and 305(4) may calculate a corresponding physical machine vector in response to receipt of the migration initiation message. Also at 195, each of the servers 305(1), 305(3), and 305(4) is configured to obtain its previously stored threshold vector. That is, each server 305(1), 305(3), and 305(4) has a corresponding threshold vector V_TH_305(1), V_TH_305(3), and V_TH_305(4) that represents the total allowable workload of various server resources.

At 200, each of the servers 305(1), 305(3), and 305(4) is configured to update its corresponding physical machine vector to include the virtual machine vector for virtual machine 320(4) (V_VM_320(4)) to produce physical estimation vectors (V_PHYE). The physical estimation vectors for servers 305(1), 305(3), and 305(4) are shown below as:

$$V\_PHYE\_305(1) = V\_PHY\_305(1) + V\_VM\_320(4)$$

$$V\_PHYE\_305(3) = V\_PHY\_305(3) + V\_VM\_320(4)$$

$$V\_PHYE\_305(4) = V\_PHY\_305(4) + V\_VM\_320(4)$$

At 205, each of the servers 305(1), 305(3), and 305(4) is configured to compare its physical estimation vector to its corresponding threshold vector to determine if acceptance of the virtual machine will lead to over-subscription. For example, with specific reference to server 305(3), server 305 (3) sequentially compares the vector entries in its physical estimation vector V_PHYE_305(3) to the vector entries in its threshold vector V_TH_305(3). If all of the vector entries in the physical estimation vector V_PHYE_305(3) are less than the corresponding threshold vector entries in threshold vector V_TH_305(3), then the resources of server 305(3) would not be over-subscribed as the result of the addition of virtual machine 320(4), and server 305(3) may be a possible migration destination (i.e., if all of $V\_PHYE\_P_i < V\_TH\_T_i$, then there is no over-subscription). However, if it is determined that any one of the physical machine vector entries are greater than the corresponding threshold vector entries, then the resources of server 305(3) would be over-subscribed through the addition of virtual machine 320(4), and server 305(3) is not a possible migration destination (i.e., if one of $V\_PHYE\_P_i > V\_TH\_T_i$, then there is over-subscription).

If a server 305(1), 305(3), or 305(4) has sufficient capacity to accept the virtual machine 320(4), then at 210 the server will send a virtual machine acceptance message (VM_ACCEPT) back to server 305(2). The virtual machine acceptance messages may include information about the server (e.g., server 305(3)) that transmits the acceptance message. This information may include, for example, an indication of the physical location of server 305(3) in the data center 300, an indication of the distance between server 305(3) and server 305(2), the physical machine vector for server 305(3), the threshold vector for server 305(3), physical estimation vector for server 305(3), etc.

At 215, server 305(2) evaluates any received virtual machine acceptance messages and any server information contained therein to select a migration destination for virtual machine 320(4). In one example, server 305(2) may select a server that is the closest in physical proximity to server 305 (2). The closest server may be selected in order minimize migration time. In another example, server 305(2) may select a server that was the first to send the virtual machine acceptance message, where the first received response may indicate the closest server.

In still another example, the server 305(2) uses the physical machine vectors in the virtual machine acceptance messages to select a server based on differences between threshold values and utilization. This so-called threshold difference selection process uses a comparison between a threshold and a particular metric to determine which of the potential migration destinations is best suited to receive the virtual machine 320(4). For example, server 305(3) may have a CPU utilization workload of 35% and a CPU utilization threshold of 65% yielding a threshold offset (availability) of 30%. Server 305(4) may have a CPU utilization workload of 45% and a CPU utilization threshold of 65% yielding a threshold offset of 20%. This allows server 305(2) to determine that server 305(3) has more CPU capacity than server 305(4), and that server 305(3) should receive virtual machine 320(4).

In a further example, after calculating the threshold offsets of servers 305(3) and 305(4), server 305(2) may further examine the CPU utilization of virtual machine 320(4). Continuing with the above example, virtual machine 320(4) may have an expected CPU utilization of 18% and, as noted, server 305(3) has a CPU availability of 30% while server has a a CPU availability of 20%. In this example, server 305(2) may select server 305(4) as the migration destination to put load of the server 305(4) at a CPU level that is just below the threshold value. In this way, the migration of virtual machine 320(4) to server 305(4) may be a better utilization of resources that a migration to server 305(3).

At 220, server 305(2) may initiate migration of virtual machine 320(4) to the selected destination server. The migration of virtual machine 320(4) may occur through one or more conventional virtual machine migration mechanisms.

As noted above, when transmitting the virtual machine migration message, server 305(2) also started a countdown timer. If no virtual machine acceptance messages are received before expiration of this timer, server 305(2) may determine that the overall load in the data center 300 is near or over an acceptable level. As such, server 305(2) may trigger a message which will activate (e.g., boot up) an additional physical machine. Server 305(2) may then migrate virtual machine 320(4) to this additional physical machine.

FIGS. 3A and 3B illustrate a method 150 in which a server 305(2) is oversubscribed and operates as a transmitting node to migrate a virtual machine to another server. FIG. 4 illustrates a further method 225 where a server 305(1) operates as a receiving node to receive migrated virtual machines. Method 225 begins at 230 where server 305(1) broadcasts a virtual machine request message (READY_TO_RECEIVE_VM) to the other servers in data center 300. This virtual machine request message indicates to the other servers that server 305(1) has capacity and can receive migrated virtual machines. When the virtual machine request message is broadcast, the server 305(1) also starts a countdown timer that is described further below.

At 235, the other servers 305(2), 305(3), and 305(4) will evaluate their present resource utilization using the above described physical machine and threshold vectors. Based on the results of this evaluation, the other servers 305(2), 305(3), and 305(4) will determine if a virtual machine may be migrated to server 305(1). If no virtual machine is to be migrated, at 240 the other servers 305(2), 305(3), and 305(4) may take no action. Alternatively, if a virtual machine is to be migrated, at 245, one or more of the other servers 305(2), 305(3), and 305(4) may transmit a migration initiation message (INITIATE_VM_MIGRATE) back to server 305(1). In this case, at 250, server 305(1) may perform the operations of 205 and 210 in FIG. 4B to determine if it can accept a virtual machine identified in the migration initiation message. At 255, the identified virtual machine may be migrated.

At 260, a determination is made as to whether there are additional virtual machines to migrate (i.e., server 305(1) determines if multiple migration initiation messages were received). If there are additional virtual machines to migrate, method 225 returns to 250. If there are no additional virtual machines to migrate, method 225 returns to 230.

As noted above, when the virtual machine request message is transmitted, server 305(1) also starts a countdown timer. If, at 240, the other servers 305(2), 305(3), and 305(4) take no action and do not transmit a migration initiation message prior to expiration of the countdown timer, method 225 may proceed to 265 where server 305(1) broadcasts a threshold reduce message (THRESHOLD_REDUCE) to the other servers in the data center 300. This threshold reduce message is designed to adjust the acceptable thresholds of one or more of the other servers in the data center so as to trigger a migration in response to a subsequently transmitted virtual machine request message. For example, the threshold reduce message may be transmitted to cause a reduction in the CPU utilization from 65% to 50%.

In order to prevent the threshold reduction message from affecting properly loaded servers, the threshold reduce message may also include an indicator such that the threshold reduction will only be performed by certain servers. For example, the threshold reduce message may indicate that the threshold reduction should only occur on servers having less than two (2) virtual machines.

At 270, the other servers will reduce their thresholds, as applicable. After reduction of the selected thresholds, a determination is made as to whether a consolidation endpoint has been reached. A consolidation endpoint may be identified by time, number of servers, locations of servers, a threshold reduction limit, or other value. If the consolidation endpoint has been reached, method 225 ends. If the consolidation endpoint has not been reached, method 225 returns to 230.

Method 225 is based on the premise that the virtual machines may be distributed in the data center such that several physical servers are underutilized. As such, method 225 provides a mechanism by which a server may proactively trigger a consolidation process in the absence of user intervention or a centralized consolidation mechanism. The iterative nature of method 225 allows the consolidation process to continue until a predetermined or selected consolidation endpoint is reached.

It is to be appreciated that, in certain circumstances, the various vector entry comparisons in methods 150 and 225 may result in a determination that a physical machine vector entry equals a corresponding threshold vector entry. In such cases, the comparing server may determine that the server and/or its supporting networking elements are over-subscribed or within an acceptable limit, depending on the selected configuration, the type of metric, etc.

FIGS. 3A, 3B and 4 illustrate several specific examples for the dynamic virtual machine consolidation techniques. It is to be appreciated that the dynamic virtual machine consolidation techniques may be executed using, for example, different network arrangements, different workload metrics, different thresholds, etc. For example, in one alternative, the networking elements (e.g., switches, routers, etc.) may be configured to detect the above noted messages transmitted between servers. The networking elements may also take corrective action based on the messages (e.g., shutdown when corresponding servers are deactivated, etc.

VLANs can be considered as a resource just as network bandwidth. However, VLANs are created at the switch. Thus, if a VM is moved due to threshold of VLANs increasing beyond a certain limit, switches need to be involved in this VM migration and an explicit handshake is needed between the switches (the switch that hosts the current VM and the switch that will be a future host).

Figure 6:
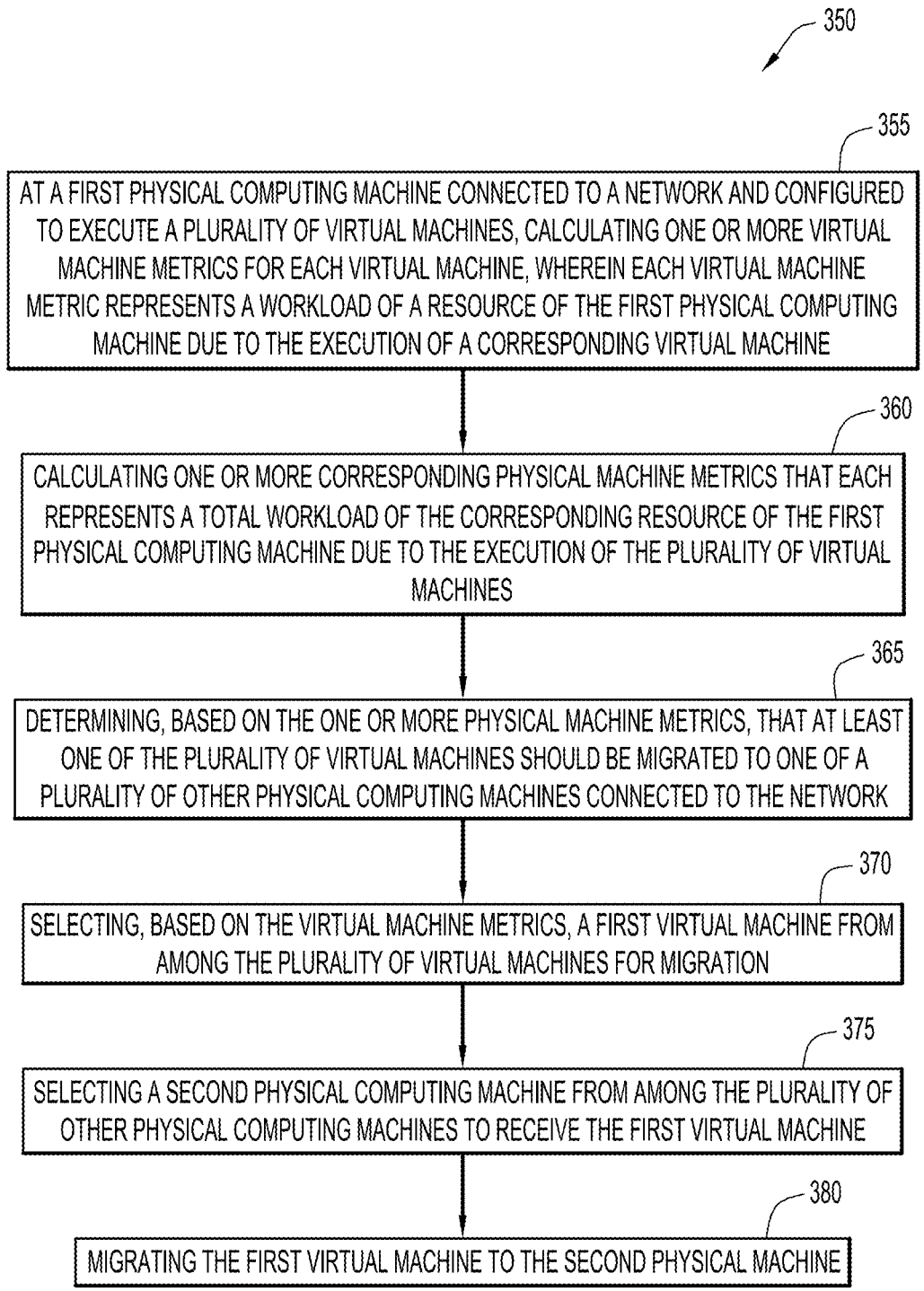
FIG. 6 is a high-level flowchart of an example method for dynamic consolidation of virtual machines in a data center.

FIG. 6 is a high level flowchart of a method 350 executed at a first physical computing machine executing a plurality of virtual machines and connected to a network in accordance with examples provide herein. Method 350 begins at 355 where one or more virtual machine metrics for each virtual machine are calculated. Each virtual machine metric represents a workload of a resource of the first physical computing machine due to the execution of a corresponding virtual machine. At 360, one or more corresponding physical machine metrics that each represent a total workload of the corresponding resource of the first physical computing machine due to the execution of the plurality of virtual machines are calculated. At 365, it is determined, based on the one or more physical machine metrics, that at least one of the plurality of virtual machines should be migrated to one of a plurality of other physical computing machines connected to the network. At 370, a first virtual machine is selected from among the plurality of virtual machines for migration. At 375, a second physical computing machine is selected from among the plurality of other physical computing machines to receive the first virtual machine. At 380, the first virtual machine is migrated to the second physical machine.

Figure 7:
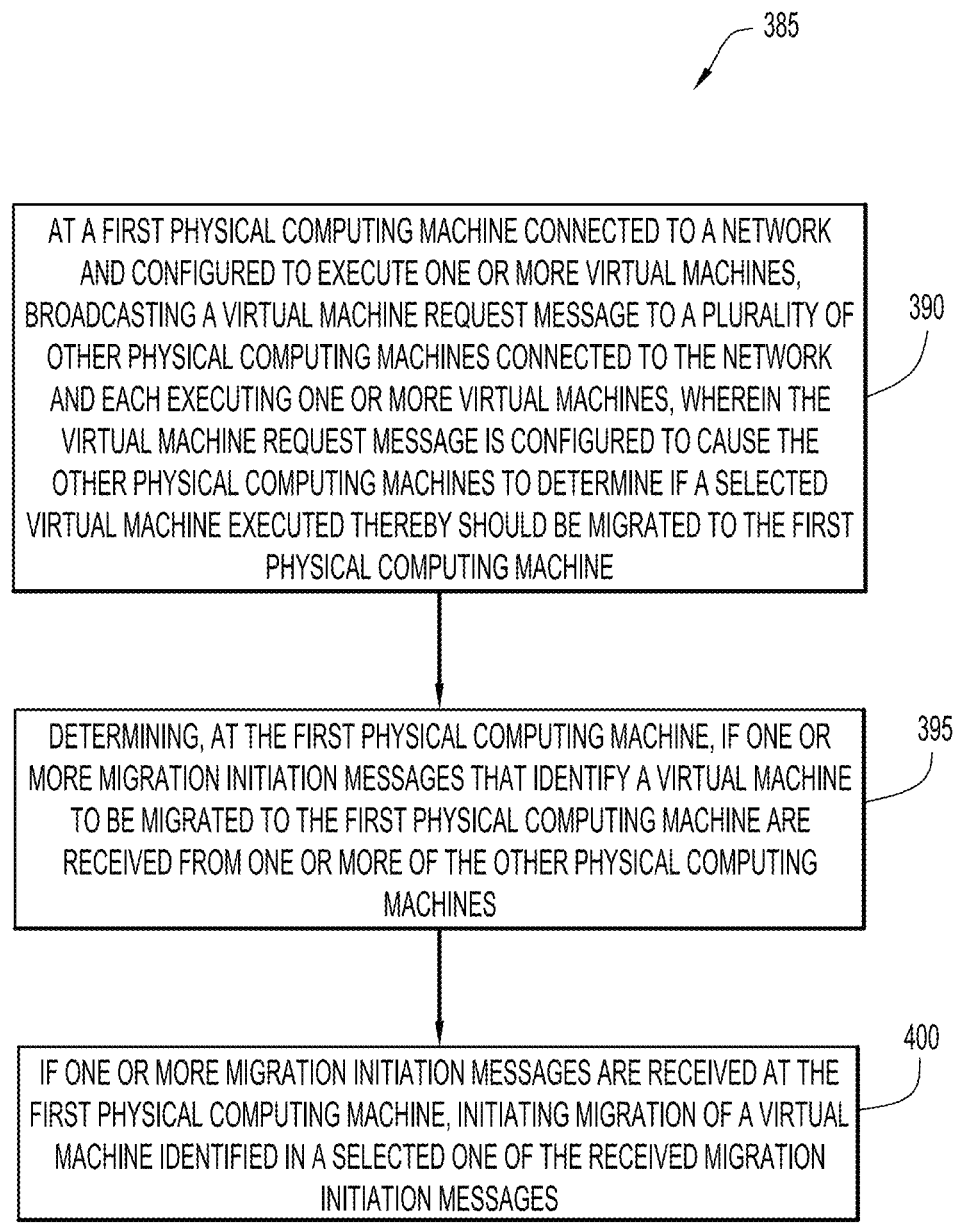
FIG. 7 is a high-level flowchart of another example method for dynamic consolidation of virtual machines in a data center.

FIG. 7 is a high level flowchart of another method 385 executed at a first physical computing machine configured to execute a plurality of virtual machines and connected to a network in accordance with examples provide herein. At 390, a virtual machine request message is broadcast to a plurality of other physical computing machines connected to the network. Each of the plurality of other physical computing machines execute one or more virtual machines and the virtual machine request message is configured to cause the other physical computing machines to determine if a selected virtual machine executed thereby should be migrated to the first physical computing machine. At 395, a determination is made at the first physical computing machine as to whether or not one or more migration initiation messages that identify a virtual machine to be migrated to the first physical computing machine are received from one or more of the other physical computing machines. At 400, if one or more migration initiation messages are received at the first physical computing machine, migration of a virtual machine identified in a selected one of the received migration initiation messages is initiated.

Provided herein is a distributed and dynamic mechanism for consolidating virtual machines in a data center so as to achieve power-saving benefits. The techniques do not utilize a central controller and each physical machine in the arrangement can operate to initiate shut down of physical machines or rebooting of physical machines as per the load demand in the data center.

The above description is intended by way of example only.

What is claimed is:

1. A method comprising:
    at a first physical computing machine connected to a network and configured to execute one or more virtual machines, broadcasting a virtual machine request message to a plurality of other physical computing machines connected to the network and each executing one or more virtual machines, wherein the virtual machine request message is configured to cause the other physical computing machines to determine if a selected virtual machine executed thereby should be migrated to the first physical computing machine;
    determining, at the first physical computing machine, if one or more migration initiation messages that identify a virtual machine to be migrated to the first physical computing machine are received from one or more of the other physical computing machines; and
    if one or more migration initiation messages are received at the first physical computing machine, initiating migration of a virtual machine identified in a selected one of the received migration initiation messages.

2. The method of claim 1, wherein prior to initiating migration of the identified virtual machine:
    determining if the first physical computing machine has sufficient resources to support the identified virtual machine.

3. The method of claim 2, wherein determining if the first physical machine has sufficient capacity to support the identified virtual machine comprises:
    calculating one or more virtual machine metrics for each of any virtual machines executed at the first physical computing machine, wherein each virtual machine metric represents a workload of a resource of the first physical computing machine due to the execution of a corresponding virtual machine;
    calculating one or more corresponding physical machine metrics that each represent a total workload of the corresponding resource of the first physical computing machine due to the execution of the executed virtual machines;
    obtaining threshold values that each represent a maximum acceptable workload for each of the resources of the first physical computing machine for which a physical machine metric is calculated; and
    comparing the physical machine metrics to corresponding threshold values to determine whether each of the physical machine metrics are below the corresponding threshold value.

4. The method of claim 3, further comprising:
    creating a physical machine vector that comprises physical machine vector entries that each correspond to one of the physical machine metrics;
    obtaining a threshold vector comprising threshold vector entries that each correspond to a threshold value; and
    comparing the physical machine vector to the threshold vector to determine whether each of the physical machine metrics are below the corresponding threshold value.

5. The method of claim 1, further comprising:
    starting a countdown timer when broadcasting the virtual machine request message;
    if one or more migration initiation messages are not received prior to expiration of the countdown timer, transmitting a threshold reduce message to the other physical computing machines, wherein the threshold reduce message is configured to alter criteria used by the other physical computing machines to determine if a selected executed virtual machine should be migrated to the first physical computing machine; and
    re-broadcasting the virtual machine request message.

6. The method of claim 1, further comprising:
    receiving, at a second physical computing machine executing a plurality of virtual machines, a virtual machine request message sent by the first physical computing machine;

evaluating, at the second physical computing machine, the present utilization of the second physical computing machine.

7. The method of claim 6, wherein evaluating the present utilization of the second physical computing machine comprises:
calculating one or more virtual machine metrics for each virtual machine executed at the second physical computing machine, wherein each virtual machine metric represents a workload of a resource of the second physical computing machine due to the execution of a corresponding virtual machine;
calculating one or more corresponding physical machine metrics that each represent a total workload of the corresponding resource of the second physical computing machine due to the execution of the plurality of virtual machines;
determining, based on the one or more physical machine metrics, that at least one of the plurality of virtual machines of the second physical computing machine should be migrated to the first physical computing machine;
selecting, based on the virtual machine metrics, a first virtual machine from among the plurality of virtual machines of the second physical computing machine for migration to the first physical computing machine.

8. The method of claim 7, wherein selecting a first virtual machine from among the plurality of virtual machines for migration comprises:
executing a threshold-compliance minimization process.

9. The method of claim 6, further comprising:
creating a physical machine vector that comprises physical machine vector entries that each correspond to one of the physical computing machine metrics;
obtaining a threshold vector comprising threshold vector entries that each correspond to an represent a maximum acceptable workload for each of the resources of the first physical computing machine for which a physical machine metric is calculated;
comparing the physical machine vector to the threshold vector; and
determining that at least one of the plurality of virtual computing machines should be migrated to the first physical computing device when any one of the physical machine vector entries are greater than a corresponding threshold vector entry.

10. The method of claim 9, further comprising:
creating a virtual machine vector for each of the plurality of virtual machines, wherein each virtual machine vector includes a plurality of virtual machine vector entries corresponding to virtual machine metrics; and
creating the physical machine vector entries by combining corresponding virtual machine vector entries from the virtual machine vectors.

11. An apparatus comprising:
a network interface card connected to a data center network;
a memory; and
a processor that:
executes one or more virtual machines,
broadcasts a virtual machine request message to a plurality of physical computing machines connected to the data center network and each executing one or more virtual machines, wherein the virtual machine request message is configured to cause the other physical computing machines to determine if a selected virtual machine executed thereby should be migrated to the apparatus,
determines if one or more migration initiation messages that identify a virtual machine to be migrated to the apparatus are received from one or more of the other physical computing machines, and
if one or more migration initiation messages are received, initiates migration of a virtual machine identified in a selected one of the received migration initiation messages.

12. The apparatus of claim 11, wherein prior to initiating migration of the identified virtual machine the processor determines if the apparatus has sufficient resources to support the identified virtual machine.

13. The apparatus of claim 12, wherein to determine if the apparatus has sufficient capacity to support the identified virtual machine, the processor:
calculates one or more virtual machine metrics for each of any virtual machines executed by the processor, wherein each virtual machine metric represents a workload of a resource of the apparatus due to the execution of a corresponding virtual machine;
calculates one or more corresponding physical machine metrics that each represent a total workload of the corresponding resource of the apparatus due to the execution of the executed virtual machines;
obtains threshold values that each represent a maximum acceptable workload for each of the resources of the apparatus for which a physical machine metric is calculated; and comparing the physical machine metrics to corresponding threshold values to determine whether each of the physical machine metrics are below the corresponding threshold value.

14. The apparatus of claim 13, wherein the processor:
creates a physical machine vector that comprises physical machine vector entries that each correspond to one of the physical machine metrics;
obtains a threshold vector comprising threshold vector entries that each correspond to a threshold value; and
compares the physical machine vector to the threshold vector to determine whether each of the physical machine metrics are below the corresponding threshold value.

15. The apparatus of claim 11, wherein the processor:
starts a countdown timer when broadcasting the virtual machine request message;
if one or more migration initiation messages are not received prior to expiration of the countdown timer, transmits a threshold reduce message to the other physical computing machines, wherein the threshold reduce message is configured to alter criteria used by the other physical computing machines to determine if a selected executed virtual machine should be migrated to the apparatus; and
re-broadcast the virtual machine request message.

16. One or more computer readable storage media encoded with software comprising computer executable instructions and when the software is executed operable to:
at a first physical computing machine connected to a network and configured to execute one or more virtual machines, broadcast a virtual machine request message to a plurality of other physical computing machines connected to the network and each executing one or more virtual machines, wherein the virtual machine request message is configured to cause the other physical computing machines to determine if a selected virtual machine executed thereby should be migrated to the first physical computing machine;

determine, at the first physical computing machine, if one or more migration initiation messages that identify a virtual machine to be migrated to the first physical computing machine are received from one or more of the other physical computing machines; and if one or more migration initiation messages are received at the first physical computing machine, initiate migration of a virtual machine identified in a selected one of the received migration initiation messages.

17. The computer readable storage media of claim 16, further comprising instructions operable to:

prior to initiating migration of the identified virtual machine, determine if the first physical computing machine has sufficient resources to support the identified virtual machine.

18. The computer readable storage media of claim 17, wherein the instructions operable to determine if the first physical machine has sufficient capacity to support the identified virtual machine comprise instructions operable to:

calculate one or more virtual machine metrics for each of any virtual machines executed at the first physical computing machine, wherein each virtual machine metric represents a workload of a resource of the first physical computing machine due to the execution of a corresponding virtual machine;

calculate one or more corresponding physical machine metrics that each represent a total workload of the corresponding resource of the first physical computing machine due to the execution of the executed virtual machines;

obtain threshold values that each represent a maximum acceptable workload for each of the resources of the first physical computing machine for which a physical machine metric is calculated; and compare the physical machine metrics to corresponding threshold values to determine whether each of the physical machine metrics are below the corresponding threshold value.

19. The computer readable storage media of claim 18, further comprising instructions operable to:

create a physical machine vector that comprises physical machine vector entries that each correspond to one of the physical machine metrics;

obtain a threshold vector comprising threshold vector entries that each correspond to a threshold value; and compare the physical machine vector to the threshold vector to determine whether each of the physical machine metrics are below the corresponding threshold value.

20. The computer readable storage media of claim 16, further comprising instructions operable to:

start a countdown timer when broadcasting the virtual machine request message;

if one or more migration initiation messages are not received prior to expiration of the countdown timer, transmit a threshold reduce message to the other physical computing machines, wherein the threshold reduce message is configured to alter criteria used by the other physical computing machines to determine if a selected executed virtual machine should be migrated to the first physical computing machine; and re-broadcast the virtual machine request message.

* * * * *